US012034265B2

(12) United States Patent
France et al.

(10) Patent No.: US 12,034,265 B2
(45) Date of Patent: Jul. 9, 2024

(54) TERMINAL BLOCK

(71) Applicant: Tyco Electronics France SAS, Pontoise (FR)

(72) Inventors: Philippe France, Pontoise (FR); Geoffrey Moine, Pontoise (FR); Anna-Line Escoffier, Pontoise (FR); Laurene Seguin, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 157 days.

(21) Appl. No.: 17/585,151

(22) Filed: Jan. 26, 2022

(65) Prior Publication Data

US 2022/0239021 A1 Jul. 28, 2022

(30) Foreign Application Priority Data

Jan. 27, 2021 (EP) .................................... 21305104

(51) Int. Cl.
*H01R 9/26* (2006.01)

(52) U.S. Cl.
CPC .................................. *H01R 9/2608* (2013.01)

(58) Field of Classification Search
CPC .... H01R 9/2608; H01R 4/4845; H01R 11/12; H01R 31/08
See application file for complete search history.

(56) References Cited

U.S. PATENT DOCUMENTS

| | | | | |
|---|---|---|---|---|
| 6,851,967 | B2 * | 2/2005 | Miyoshi | H01R 4/48365 439/441 |
| 7,762,834 | B2 * | 7/2010 | Schrader | H01R 4/48365 439/441 |
| 8,851,920 | B2 * | 10/2014 | Wu | H01R 9/16 439/441 |
| 8,979,573 | B1 | 3/2015 | Barber et al. | |
| 9,601,843 | B2 | 3/2017 | Jarmuth | |
| 9,793,652 | B2 | 10/2017 | Bausch et al. | |
| 9,806,462 | B2 * | 10/2017 | Wendt | H01R 13/639 |
| 10,374,332 | B2 | 8/2019 | Chaillet et al. | |
| 2013/0330985 | A1 | 12/2013 | Willinski | |
| 2015/0147907 | A1 | 5/2015 | Goerlitzer et al. | |

(Continued)

FOREIGN PATENT DOCUMENTS

| | | |
|---|---|---|
| CN | 209001163 U | 6/2019 |
| DE | 20313041 U1 | 10/2003 |

(Continued)

OTHER PUBLICATIONS

European Search Report and Written Opinion, App. No. EP 21305104, dated Jun. 22, 2021, 6 pages.

(Continued)

*Primary Examiner* — Phuong Chi Thi Nguyen
(74) *Attorney, Agent, or Firm* — Barley Snyder

(57) ABSTRACT

A terminal block includes an insulating casing defining a recess receiving a conductive bar and a retaining spring. The conductive bar includes a base portion, a support leg attached to the base portion and a cooperating leg attached to the base portion. In a mounted position of the conductive bar and the retaining spring within the recess, the support leg engages with a support part of the retaining spring, and the cooperating leg is positioned to engage with a conductor inserted into a plug of the terminal block.

20 Claims, 2 Drawing Sheets

(56) References Cited

U.S. PATENT DOCUMENTS

| | | | |
|---|---|---|---|
| 2016/0211591 A1 | 7/2016 | Herrmann et al. | |
| 2018/0277968 A1 | 9/2018 | Stjepanovic et al. | |
| 2019/0288408 A1 | 9/2019 | Wu et al. | |
| 2019/0288413 A1 | 9/2019 | Wu et al. | |

FOREIGN PATENT DOCUMENTS

| | | | |
|---|---|---|---|
| DE | 102015113512 | B3 | 12/2016 |
| DE | 202017006317 | U1 | 3/2019 |
| EP | 1657789 | A1 | 5/2006 |
| EP | 3633795 | A1 | 4/2020 |
| WO | 2014032979 | A1 | 3/2014 |
| WO | 2018221312 | A1 | 12/2018 |
| WO | 2019174982 | A1 | 9/2019 |
| WO | 2020224979 | A1 | 11/2020 |

OTHER PUBLICATIONS

Chinese First Office Action dated Aug. 31, 2023 with English translation, corresponding to Application No. 202210077798.4, 20 pages.

* cited by examiner

TERMINAL BLOCK

CROSS-REFERENCE TO RELATED APPLICATIONS

This application claims the benefit of European Patent Application No. 21305104.8 filed on Jan. 27, 2021, the whole disclosure of which is incorporated herein by reference in its entirety.

FIELD OF THE INVENTION

The present disclosure relates to electrical connectors, and more particularly, to electrical terminal blocks.

BACKGROUND

Terminal blocks may be used with a conductive bar to electrically link plugged conductors. To this end, a terminal block according to the prior art includes a plurality of plugs each having a releasable mechanism for maintaining electrical contact between each conductor and the conductive bar. The release mechanism usually comprises a retaining spring. This construction enables the constraint of the conductor within the terminal block in order to produce efficient, reliable electrical contact. Further, it is important to correctly guide the conductor during insertion such that it can be accurately placed in position relative to the retaining spring. Accordingly, an insulating casing of the terminal block may have dedicated walls, the conductive bar may have a specific form or additional accessories can be used. This is especially critical in applications used with multi-stranded conductors. Specifically, there is a need to prevent the deviation of conductor strands outside of the area between the conductive bar and the retaining spring.

For all of the above reasons, prior art terminal blocks can be complex, utilizing several parts. Accordingly, there is a need for an improved terminal block that is simplified in its construction, while still providing reliable performance.

SUMMARY

A terminal block according to an embodiment of the present disclosure includes an insulating casing defining a recess receiving a conductive bar and a retaining spring. The conductive bar includes a base portion, a support leg attached to the base portion, and a cooperating leg attached to the base portion. In a mounted position of the conductive bar and the retaining spring within the recess, the support leg engages with a support part of the retaining spring, and the cooperating leg is positioned to engage with a conductor inserted into a plug of the terminal block.

BRIEF DESCRIPTION OF THE DRAWINGS

The invention will now be described by way of example with reference to the accompanying Figures, of which.

DETAILED DESCRIPTION OF THE EMBODIMENTS

Figure 1:
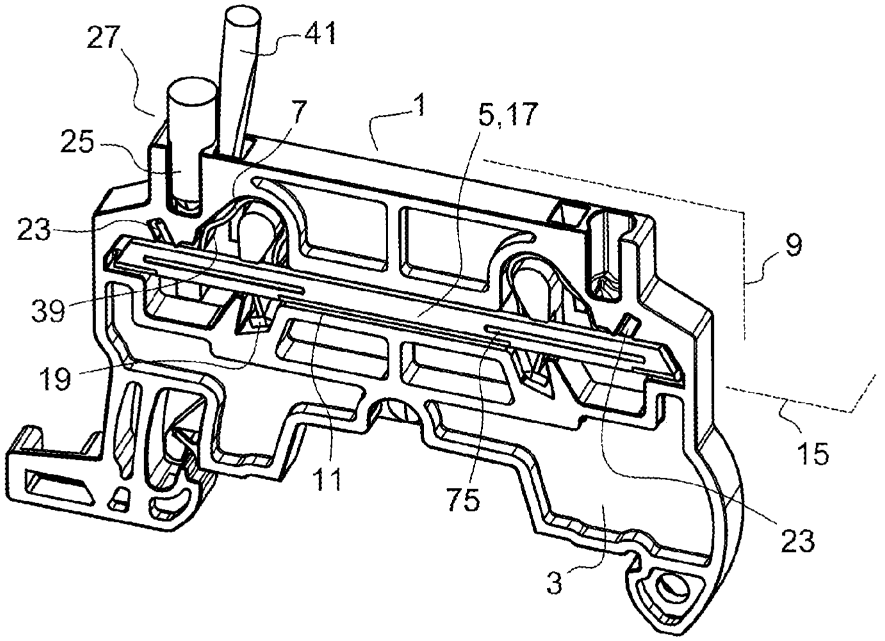
FIG. 1 is a perspective view of a terminal block with a conductive bar and a retaining spring in a mounted position.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As illustrated in FIGS. 1-4, a terminal block 1 comprises an insulating casing 3, a conductive bar 5 and a retaining spring 7. The insulating casing 3 extends according to a main plane 9 and defines a lateral recess 11 sized for an insertion of the conductive bar 5 and the retaining spring 7 transversally to the main plane 9 into a mounted position.

The conductive bar 5 (see FIGS. 3 and 4) presents in mounted position a base portion 13 extending according to a middle plane 15 transverse to the main plane 9 and a lateral portion 17 attached to the base portion 13 and extending parallel to the main plane 9. The conductive bar 5 further comprises a support leg 19 attached to the base portion 13 and configured to cooperate with a support part 21 of the retaining spring 7. A cooperating leg 23 of the conductive bar 5 is attached to the base portion 13 and configured to cooperate with a conductor 25 inserted in a plug 27 of the terminal block 1 when the conductor 25 is maintained or fixedly held by the retaining spring 7. The support leg 19 and the cooperating leg 23 are oriented transverse to the middle plane 15 and extend in opposite directions transversally to the middle plane 15. The lateral portion 17 and the cooperating leg 23 extend in the same direction transversally to the middle plane 15. In this way, the support leg 19, the cooperating leg 23 and the lateral portion 17 are each attached to the base portion 13 and extend transversally with respect to the base portion 13. The support leg 19 extends from the base portion 13 in a direction, and both the cooperating leg 23 and the lateral portion 17 extend from the base portion 13 in an opposite direction.

Figure 2:
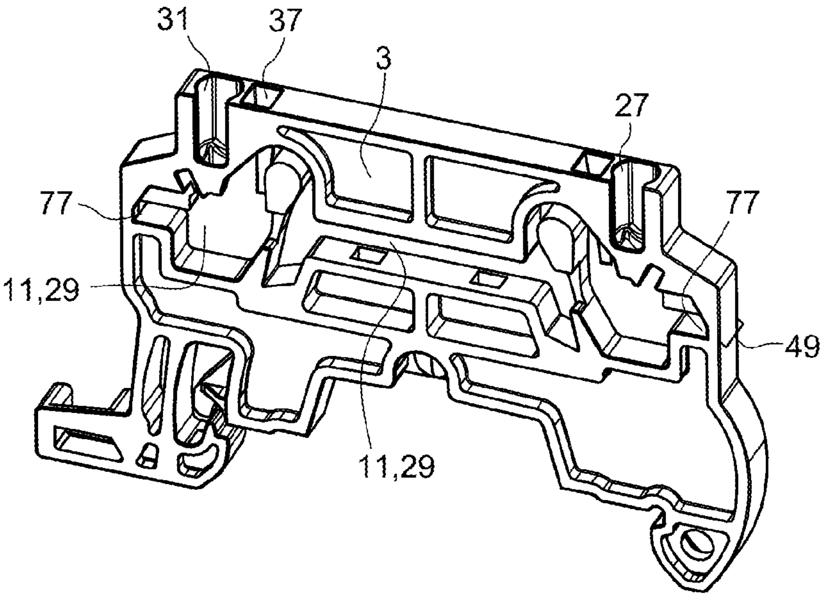
FIG. 2 is a perspective view of an insulating body of the terminal block.

As illustrated in FIG. 2, the lateral recess 11 of the insulating casing 3 defines a bottom surface 29. The retaining spring 7, the support leg 19 and the cooperating leg 23 are located between the bottom surface 29 and the lateral portion 17 transverse to the main plane 9. When inserted, the conductor 25 is located between the lateral portion 17 and the bottom surface 29 transverse to the main plane 9. The conductor 25 is then guided on one side by the conductive bar 5 and on the other side by the insulating casing 3. The conductive bar 5 defines an L-shaped profile constituted by the base portion 13 and the lateral portion 17.

The plug 27 has an inserting hole 31 made in the insulating casing 3. The inserting hole 31 extends transversally to the middle plane 15 and opens on the lateral recess 11. During insertion, the conductor 25 is maintained transversally to the main plane 9 by the insulating casing 3 on both sides in the inserting hole 31 and on one side by the lateral portion 17 and on the other side by the bottom surface 31 in the lateral recess 11.

Figure 3:
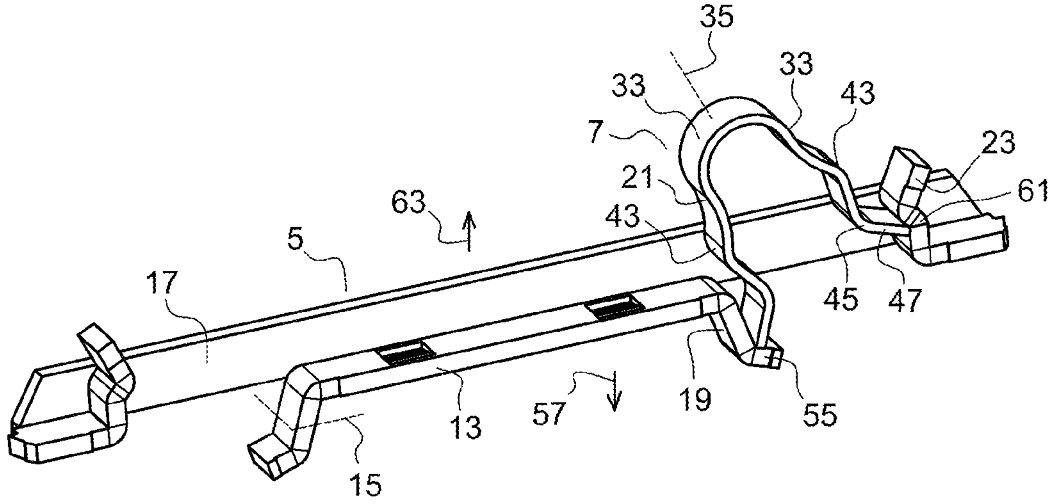
FIG. 3 is a perspective view of the conductive bar and the retaining spring.
Figure 4:
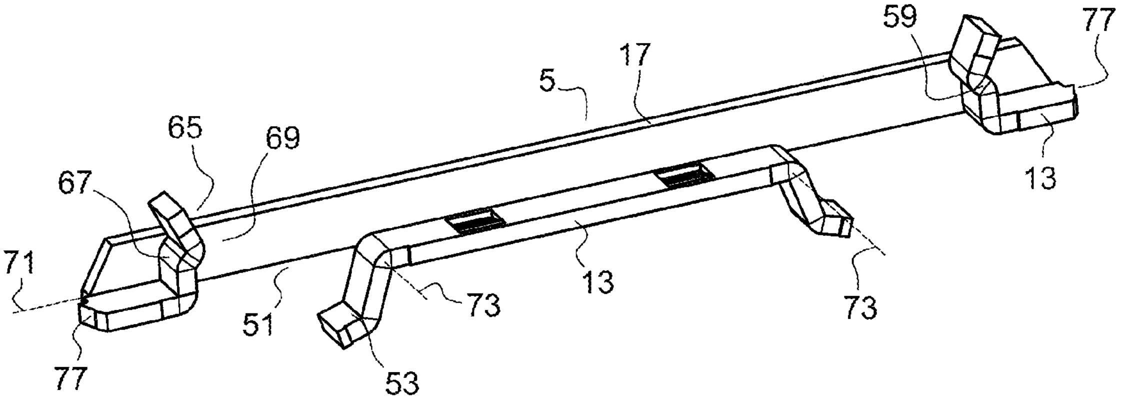
FIG. 4 is a perspective view of the conductive bar.

As illustrated in FIG. 3, the retaining spring 7 is a leaf spring provided with two strips 33 that are symmetrical with respect to a central plane 35 of the retaining spring without any constraints applied on the retaining spring. In mounted the position, the central plane 35 is transverse to the main plane 9 and to the middle plane 15. In addition, the central plane 35 is inclined with respect to the inserting hole 31. More particularly, the central plane 35 is perpendicular to the main plane 9 and inclined with respect to the middle plane 15, the inclination being greater than 45°.

Referring again to FIGS. 1 and 2, the insulating casing 3 defines actuating orifice 37 therethrough. The actuating orifice 37 extends transversally to the middle plane 15 and opens on the lateral recess 11. The actuating orifice 37 is oriented toward a movable part 39 of the retaining spring 7. The actuating orifice 37 is configured to enable a tool, such as a screwdriver 41, to displace the moving part 39. The moving part 39 is configured to exert a constraint on the conductor 25 in the absence of actuation to maintain the conductor 25 in electric contact with the cooperating leg 23.

Each strip 33 of the retaining spring 7 extends in a corresponding direction and defines two undulations. A first undulation 43 is opposed to the central plane 35 and designed to be in front of the actuating orifice 37. A second undulation 45 extends toward the central plane 35 to orient an ending part 47 of the retaining spring 7 in an inclined position with respect to the central plane 35.

The lateral recess 11 is defined by a lateral blind slot in the thickness 49 of the terminal block 1. The lateral recess 11 comprises an insert for receiving the retaining spring 7 and the conductive bar 5 within the thickness 49 of the terminal block 1. The thickness 49 of the terminal block 1 is defined as being the dimension of the terminal block 1 transversally to the main plane 9. The conductive bar 5 and the retaining spring 7 are contained within the thickness dimension of the terminal block 1.

The support leg 19 and the cooperating leg 23 are folded cut-outs of the conductive bar 5. The folded cut-outs form a passage 51 through the base portion 13 transversally to the middle plane 15. The support leg 19 has a lower blocking element 53 arranged to cooperate with a support extremity 55 of the retaining spring 7 to prevent the displacement of the support extremity 55 in a lower direction 57 opposed to the base portion 13 transverse to the middle plane 15.

The lower blocking element 53 defines a fixed place for the support extremity 55 of the retaining spring 7. During the insertion of the conductor 25 in the plug 27, the support extremity 55 stays in place transversally to the middle plane 15. The lower blocking element 53 is a placement corner engendered by a bend made in the support leg 19.

The cooperating leg 23 has a higher or upper blocking element 59 arranged to cooperate with a cooperating extremity 61 of the retaining spring 7 to prevent the displacement of the cooperating extremity in a higher or upward vertical direction 63 opposed to the base portion 13 transverse to the middle plane 15. The higher blocking element 59 defines a fixed location for the cooperating extremity 61 of the retaining spring 7. In the absence of the conductor 25 in the plug 27, the cooperating extremity 61 stays in place transversally to the middle plane 15. This means that, in the absence of the conductor 25, the support extremity 55 and the cooperating extremity 61 are maintained in place transverse to the middle plane 15. The higher blocking element 59 is a placement corner engendered by a bending made in the cooperating leg 23.

The cooperating leg 23 comprises a tilted end 65 and a linking part 67 that connects the tilted end to the base portion 13. The tilted end 65 and the linking part 67 engender a cooperating protrusion 69 for cooperating with the conductor 25. The higher blocking element 59 is located on the linking part 67.

According to an embodiment of the present disclosure, the conductive bar 5 is formed by a conductive sheet plate that is folded about a main axis 71 to form the lateral portion 17 and the base portion 13. The support leg 19 and the cooperating leg 23 are folded with respect to two parallel axes 73 that are transverse to the main axis 71.

The conductive sheet plate defines an overall rectangular form, with the lateral portion 17 being a side strip and the base portion 13, support leg 19 and cooperating leg 23 constituting the other strip. The support leg 19 and the cooperating leg 23 are contiguous parts of the other strip. Thus, the folding of the support leg 19 and of the cooperating leg 23 engender the passage 51 through the base portion 13 transverse to the middle plane 15. The side strip presents at least a groove 75 along its length which confers rigidity to the lateral portion 17.

The terminal block 1 comprises a clipping system 77 for installing conductive bar 5 in mounted position. The conductive bar 5 comprises a first part of the clipping system 77 and the insulating casing 3 comprises a second part of the clipping system 77.

The construction of the terminal block 1 laterally maintains the plugged conductor(s) 25 and also to exerts a maintaining force on the conductor(s) 25 in proximity to a junction between the base portion 13 and the lateral portion 17 with the retaining spring 7. This facilitates the insertion and the positioning of the conductor(s) 25 in the plug(s) 27 of the terminal block 1. This geometry is especially efficient when a multi-stranded conductor 25 is used but is also suitable for rigid push-in conductors 25. With a multi-stranded conductor 25, embodiments described herein improve the quality of the electrical contact as there is a limited risk of strand deviations during insertion of the conductor. Further, the plugged conductor 25 is guided and maintained laterally with a conductive bar 5 constituted by a limited amount of conductive material. The construction of the conductive bar 5 is simple as there are a few folding steps, while maintaining suitable rigidity.

In addition to the above, those areas in which it is believed that those of ordinary skill in the art are familiar, have not been described herein in order not to unnecessarily obscure the invention described. Accordingly, it should be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal block, comprising:
an insulating casing extending in a direction of a main plane and defining a lateral recess;
a conductive bar, including:
a base portion extending along a middle plane transverse to the main plane;
a lateral portion attached to the base portion and extending parallel to the main plane;
a support leg attached to the base portion; and
a cooperating leg attached to the base portion, the support leg and cooperating leg oriented transverse to the middle plane and extending in opposite directions transverse to the middle plane, the lateral portion and the cooperating leg extending in the same direction transverse to the middle plane; and
a retaining spring, the lateral recess sized to receive the conductive bar and the retaining spring transverse to the main plane in a mounted position, the support leg engaging with a support part of the retaining spring in the mounted position, the cooperating leg positioned to engage with a conductor inserted in a plug of the terminal block.

2. The terminal block according to claim 1, wherein the lateral recess of the insulating casing defines a bottom surface, and the retaining spring, the support leg and the cooperating leg are located between the bottom surface and the lateral portion transverse to the main plane.

3. The terminal block according to claim 1, wherein the plug has an insertion hole defined in the insulating casing, the insertion hole extending transverse to the middle plane and opening into the lateral recess.

4. The terminal block according to claim 1, wherein the retaining spring is a leaf spring having two strips that are symmetrical with respect to a central plane of the retaining spring.

5. The terminal block according to claim 1, wherein the conductive bar is formed of a conductive sheet plate that is folded according to a main axis to define the lateral portion and the base portion, the support leg and the cooperating leg being folded about two parallel axes that are transverse to the main axis.

6. The terminal block according to claim 1, wherein the conductive bar includes a plurality of associated support legs and cooperating legs for a plurality of corresponding plugs of the terminal block.

7. The terminal block according to claim 1, wherein the lateral recess is a lateral blind slot formed in a thickness of the terminal block and including an insert for receiving the retaining spring and the conductive bar within the thickness of the terminal block.

8. The terminal block according to claim 7, wherein the support leg and the cooperating leg are folded cut-outs of the conductive bar, the folded cut-outs defining a passage through the base portion transverse to the middle plane.

9. The terminal block according to claim 8, wherein the support leg has a lower blocking element arranged to cooperate with a support extremity of the retaining spring to prevent the displacement of the support extremity in a lower direction opposed to the base portion transverse to the middle plane.

10. The terminal block according to claim 9, wherein the lower blocking element is a corner defined by a bend made in the support leg.

11. The terminal block according to claim 10, wherein the cooperating leg has an upper blocking element positioned to engage with an end of the retaining spring to prevent the displacement of the end of the retaining spring in an upwards direction.

12. The terminal block according to claim 11, wherein the upper blocking element is a placement corner defined by a bend made in the cooperating leg.

13. The terminal block according to claim 12, wherein the cooperating leg includes a tilted end and a linking part that connects the tilted end to the base portion, the tilted end and the linking part defining a cooperating protrusion for engaging with the conductor.

14. A terminal block, comprising:
an insulating casing defining a recess;
a conductive bar arranged within the recess and including a base portion, a support leg attached to the base portion, and a cooperating leg attached to the base portion; and
a retaining spring received within the recess in a mounted position, the support leg engaging with a support part of the retaining spring, the cooperating leg adapted to engage with a conductor inserted in a plug of the terminal block.

15. The terminal block according to claim 14, wherein the recess of the insulating casing defines a bottom surface, the retaining spring, the support leg and the cooperating leg are located between the bottom surface and the base portion.

16. The terminal block according to claim 14, wherein the plug has an insertion hole defined in the insulating casing and opening into the recess.

17. The terminal block according to claim 14, wherein the retaining spring is a leaf spring having two free ends that are symmetrical with respect to a central plane of the retaining spring.

18. The terminal block according to claim 14, wherein the support leg has a lower blocking element positioned to support an end of the retaining spring.

19. The terminal block according to claim 14, wherein the support leg and the cooperating leg are folded cut-outs of the conductive bar, the folded cut-outs defining a passage through the base portion.

20. The terminal block according to claim 18, wherein the lower blocking element defines a corner formed by a bend in the support leg.

* * * * *